US010412446B2

(12) United States Patent
Major et al.

(10) Patent No.: US 10,412,446 B2
(45) Date of Patent: *Sep. 10, 2019

(54) TELEVISION CONTENT MANAGEMENT WITH INTEGRATED THIRD PARTY INTERFACE

(71) Applicant: Echostar Technologies L.L.C., Englewood, CO (US)

(72) Inventors: Robert Drew Major, Orem, UT (US); Darren Major, Pleasant Grove, UT (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,405

(22) Filed: Dec. 28, 2017

(65) Prior Publication Data

US 2018/0184156 A1  Jun. 28, 2018

Related U.S. Application Data

(63) Continuation-in-part of application No. 15/600,334, filed on May 19, 2017, which is a continuation of
(Continued)

(51) Int. Cl.
*H04N 21/439* (2011.01)
*H04N 21/478* (2011.01)
(Continued)

(52) U.S. Cl.
CPC ..... *H04N 21/4394* (2013.01); *H04N 21/2407* (2013.01); *H04N 21/4126* (2013.01);
(Continued)

(58) Field of Classification Search
CPC .......... H04N 21/2407; H04N 21/4126; H04N 21/42208; H04N 21/42209;
(Continued)

(56) References Cited

U.S. PATENT DOCUMENTS 5,978,791 A  11/1999 Farber et al.
6,263,503 B1  7/2001 Margulis
(Continued)

OTHER PUBLICATIONS

Audible Magic Corporation, White Paper, Digital Fingerprinting & Video Content Recognition Enabling New Forms of Interactive Advertising, Jun. 7, 2011.
(Continued)

*Primary Examiner* — James R Sheleheda
(74) *Attorney, Agent, or Firm* — Lorenz & Kopf PPL

(57) ABSTRACT

A method for presenting internet content associated with a set of video content is provided. During playback of the set of video content on an electronic device, the method detects, by the electronic device, that the electronic device has been repositioned to reveal blank space on a display of the electronic device, wherein the display presents the blank space and the set of video content after repositioning of the electronic device; and presents related internet content on the blank space, by the electronic device, during playback of the set of video content.

18 Claims, 9 Drawing Sheets

Related U.S. Application Data application No. 14/216,235, filed on Mar. 17, 2014, now Pat. No. 9,661,380.

(60) Provisional application No. 62/440,013, filed on Dec. 29, 2016, provisional application No. 61/800,847, filed on Mar. 15, 2013.

(51) Int. Cl.

| | |
|---|---|
| *H04N 21/4722* | (2011.01) |
| *H04N 21/81* | (2011.01) |
| *H04N 21/462* | (2011.01) |
| *H04N 21/24* | (2011.01) |
| *H04N 21/422* | (2011.01) |
| *H04N 21/41* | (2011.01) |
| *H04N 21/442* | (2011.01) |

(52) U.S. Cl.
CPC .. *H04N 21/42207* (2013.01); *H04N 21/42209* (2013.01); *H04N 21/42224* (2013.01); *H04N 21/44222* (2013.01); *H04N 21/4622* (2013.01); *H04N 21/4722* (2013.01); *H04N 21/47815* (2013.01); *H04N 21/812* (2013.01); *H04N 21/8173* (2013.01)

(58) Field of Classification Search
CPC ......... H04N 21/44222; H04N 21/4622; H04N 21/4394; H04N 21/42207; H04N 21/42224; H04N 21/4722; H04N 21/47815; H04N 21/812; H04N 21/8173
See application file for complete search history.

(56) References Cited

U.S. PATENT DOCUMENTS

| | | | |
|---|---|---|---|
| 6,928,442 | B2 | 8/2005 | Farber et al. |
| 6,968,337 | B2 | 11/2005 | Wold |
| 7,500,007 | B2 | 3/2009 | Ikezoye et al. |
| 7,529,659 | B2 | 5/2009 | Wold |
| 7,562,012 | B1 | 7/2009 | Wold et al. |
| 7,707,614 | B2 | 4/2010 | Krikorian et al. |
| 7,797,249 | B2 | 9/2010 | Schmelzer et al. |
| 7,818,444 | B2 | 10/2010 | Brueck et al. |
| 7,877,438 | B2 | 1/2011 | Schrempp et al. |
| 7,877,776 | B2 | 1/2011 | Krikorian et al. |
| 7,917,645 | B2 | 3/2011 | Ikezoye et al. |
| 8,006,314 | B2 | 8/2011 | Wold |
| 8,082,150 | B2 | 12/2011 | Wold |
| 8,086,445 | B2 | 12/2011 | Wold et al. |
| 8,401,904 | B1 | 3/2013 | Simakov et al. |
| 8,527,774 | B2 | 9/2013 | Fallows et al. |
| 8,583,643 | B2 | 11/2013 | Kanefsky |
| 9,661,380 | B2 * | 5/2017 | Major ................... H04N 21/812 |
| 9,704,220 | B1 * | 7/2017 | Bakar ...................... G09G 3/20 |
| 2002/0042914 | A1 | 4/2002 | Walker et al. |
| 2004/0148424 | A1 | 7/2004 | Berkson et al. |
| 2006/0174287 | A1 | 8/2006 | Maeda |
| 2006/0222321 | A1 | 10/2006 | Russ |
| 2009/0235313 | A1 | 9/2009 | Maruyama et al. |
| 2009/0288113 | A1 | 11/2009 | Skinner |
| 2010/0169934 | A1 | 7/2010 | Kennedy |
| 2010/0247061 | A1 * | 9/2010 | Bennett ............ G06F 17/30056 386/247 |
| 2011/0162002 | A1 | 6/2011 | Jones et al. |
| 2011/0163969 | A1 * | 7/2011 | Anzures ............... G06F 3/04883 345/173 |
| 2011/0289098 | A1 | 11/2011 | Oztaskent et al. |
| 2012/0210216 | A1 | 8/2012 | Hurst |
| 2014/0007155 | A1 | 1/2014 | Vemparala et al. |
| 2014/0195557 | A1 | 7/2014 | Oztaskent et al. |
| 2014/0229975 | A1 | 8/2014 | Bolden et al. |
| 2014/0289597 | A1 * | 9/2014 | Kim ...................... G06F 16/957 715/205 |
| 2015/0074589 | A1 * | 3/2015 | Pan ...................... G06F 3/04886 715/781 |
| 2016/0196240 | A1 * | 7/2016 | Kim ...................... G06F 17/212 715/238 |
| 2017/0177115 | A1 * | 6/2017 | Chung ................... G06F 3/044 |

OTHER PUBLICATIONS

U.S. Patent and Trademark Office, Non-Final Office Action, dated May 23, 2014 for U.S. Appl. No. 13/836,688.

Major, Robert Drew, Pre-Distribution Identification of Broadcast Television Content Using Audio Fingerprints, U.S. Appl. No. 13/836,688, filed Mar. 15, 2013.

USPTO, Office Action in U.S. Appl. No. 13/836,688 dated Oct. 19, 2017.

U.S. Patent and Trademark Office, Final Office Action, dated Jan. 29, 2015 for U.S. Appl. No. 13/836,688.

USPTO, Office Action for U.S. Appl. No. 13/836,688 dated Aug. 17, 2015.

USPTO, Final Office Action for U.S. Appl. No. 13/836,688 dated May 15, 2017.

USPTO, Office Action in U.S. Appl. No. 15/600,334 dated Feb. 12, 2018.

* cited by examiner

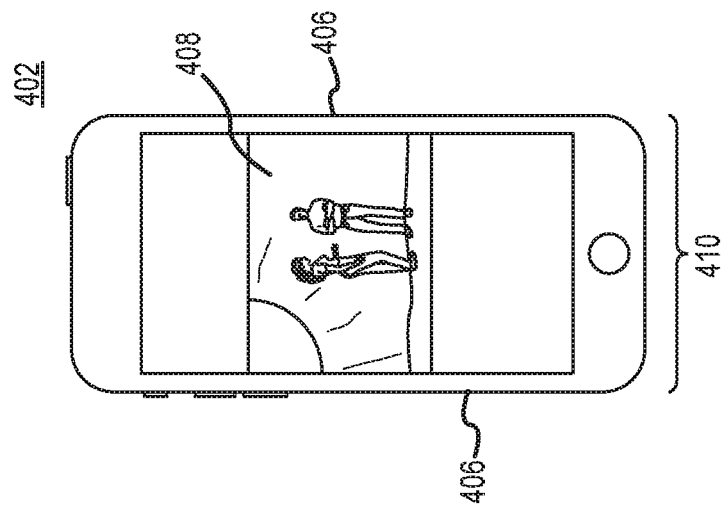
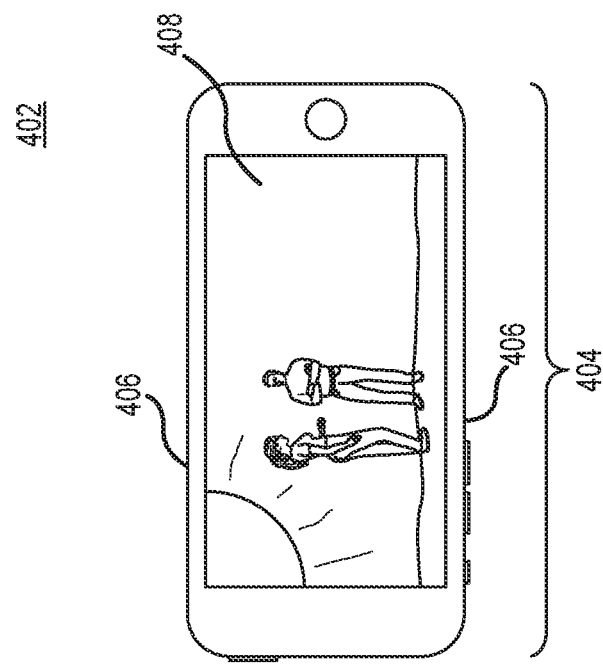
FIG.4

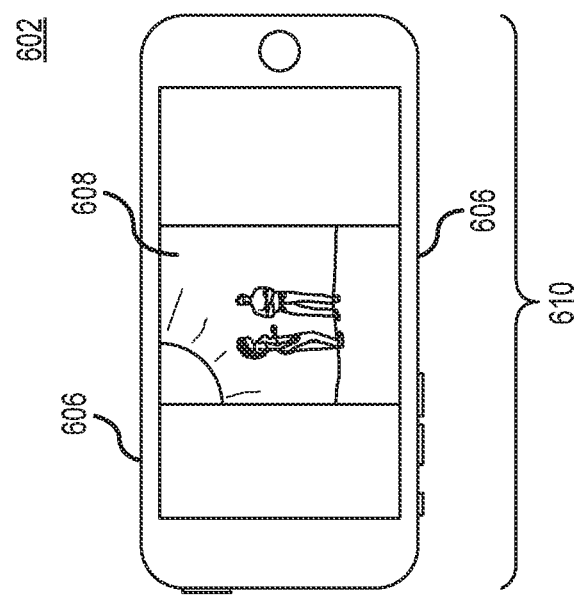
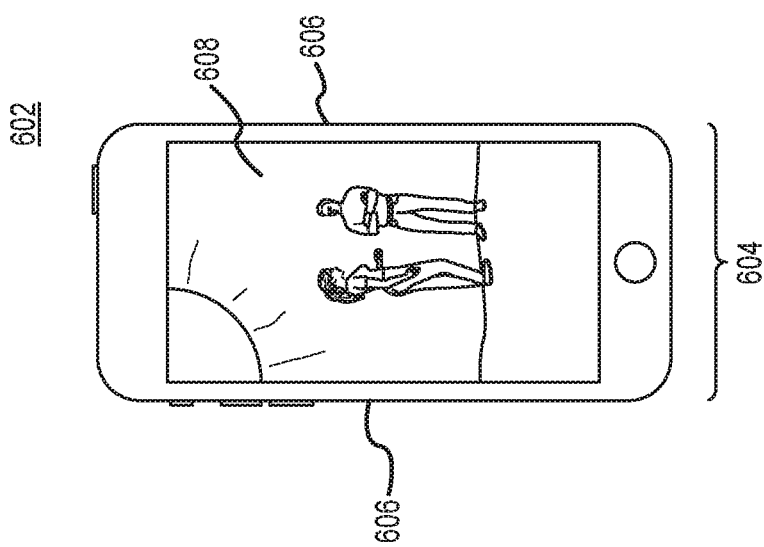
FIG.6

TELEVISION CONTENT MANAGEMENT WITH INTEGRATED THIRD PARTY INTERFACE

RELATED APPLICATION

This application is a continuation-in-part of U.S. patent application Ser. No. 15/600,334, filed on May 19, 2017, which claims the benefit of U.S. patent application Ser. No. 14/216,235, filed on Mar. 17, 2014, now U.S. Pat. No. 9,661,380, which claims the benefit of U.S. Provisional Patent Application Ser. No. 61/800,847, filed on Mar. 15, 2013. This application also claims the benefit of U.S. Provisional Patent Application Ser. No. 62/440,013, filed on Dec. 29, 2016.

TECHNICAL FIELD

The present disclosure generally relates to manageably expanding a television viewer's media experience, including second screen interactions with advertisers, retailers, content providers, or other third parties.

BACKGROUND

With the advent of digital streaming technologies, as well as the development of ever-advanced network communications and data processing devices, television viewers are no longer content to simply watch TV in a non-interactive manner. To the contrary, many viewers continually demand new and exciting viewing experiences that provide additional features and opportunities. At the same time, advertisers, retailers and other third parties are seeking increasing opportunities to interact with end customers.

It is therefore desirable to create systems, devices and methods that manageably expand the television viewing experience through improved interaction with advertisers, retailers and/or other third parties. These and other desirable features and characteristics will become apparent from the subsequent detailed description and the appended claims, taken in conjunction with the accompanying drawings and this background section.

BRIEF SUMMARY

Various embodiments provide a television remote control application on a tablet, smartphone or similar device. The application includes an HTML5 or other application program interface (API) that allows advertisers, retailers or other third parties to access the remote control application for providing useful features. The third party content could be coordinated with television content currently being watched by the viewer.

According to various exemplary embodiments, a media player, personal computer, tablet computer, mobile phone, video game player or other computing device suitably comprises a processor, a memory and an interface to a network such as the Internet. The processor configured to execute a remote control application that controls television content presented on a display viewed by a viewer, wherein the remote control application comprises an application program interface that allows an application controlled by a third party to provide content to the remote control application relates to the content currently being viewed by the user.

Other embodiments provide methods executable by personal computers, mobile phones, laptop or tablet computers, video game players and/or other computing devices to provide user control of a television. The method suitably comprising executing a remote control application on the computing device that generates a display on a user interface that presents content from a third party, wherein the third party provides the content to the remote control application via an application program interface, and wherein the remote control application requests the content from the third party based upon content currently presented on the viewer's television.

Still other embodiments provide methods executable by a computing device to provide user control of a television. The method suitably comprises executing a remote control application that generates a display on a user interface that presents content from a third party, wherein the third party provides the content to the remote control application via an application program interface, and wherein the remote control application requests the content from the third party based upon content currently presented on the viewer's television.

Additional and alternate embodiments, aspects and other features are described in more detail herein.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an example system 100 to allow third party access to a remote control application, in accordance with the disclosed embodiments;

FIG. 4 is a diagram of an electronic device positioned in a landscape orientation and positioned in a portrait orientation, in accordance with the disclosed embodiments;

FIG. 6 is a second diagram of an electronic device positioned in a landscape orientation and positioned in a portrait orientation, in accordance with the disclosed embodiments;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments provide a remote control application 105 executable on a tablet PC, computer system, mobile telephone, video game player, personal digital assistant, remote control and/or other device 102 that not only controls television content presented on the viewer's television displays 120A-C, but that also allows advertisers, retailers and/or other third parties to access the viewer's interface via an application program interface (API). In various embodiments, an application 105 includes an HTML5 or similar API that allows third party services 130 to provide additional content such as images, links, video, games or anything else for the customer's enjoyment. The third party content may be presented in a window 107 of the device's display, as desired. Content from the third party may be presented in a browser window within the application interface, for example, using Javascript or similar constructs.

Other embodiments of the present disclosure provide methods and apparatus for the presentation of the third party content on empty or blank space presented on a display of an electronic device when the electronic device changes orientation (i.e., "flips" from portrait orientation to landscape orientation, or the reverse) and in response, a presentation of a set of audio/video content is presented using a smaller area of the display. In various embodiments, the electronic device may be flipped from a first orientation to a second orientation, and in response, the electronic device automatically presents third party content in the formerly empty space adjacent to the reduced-size presentation of audio/video content.

Figure 1:
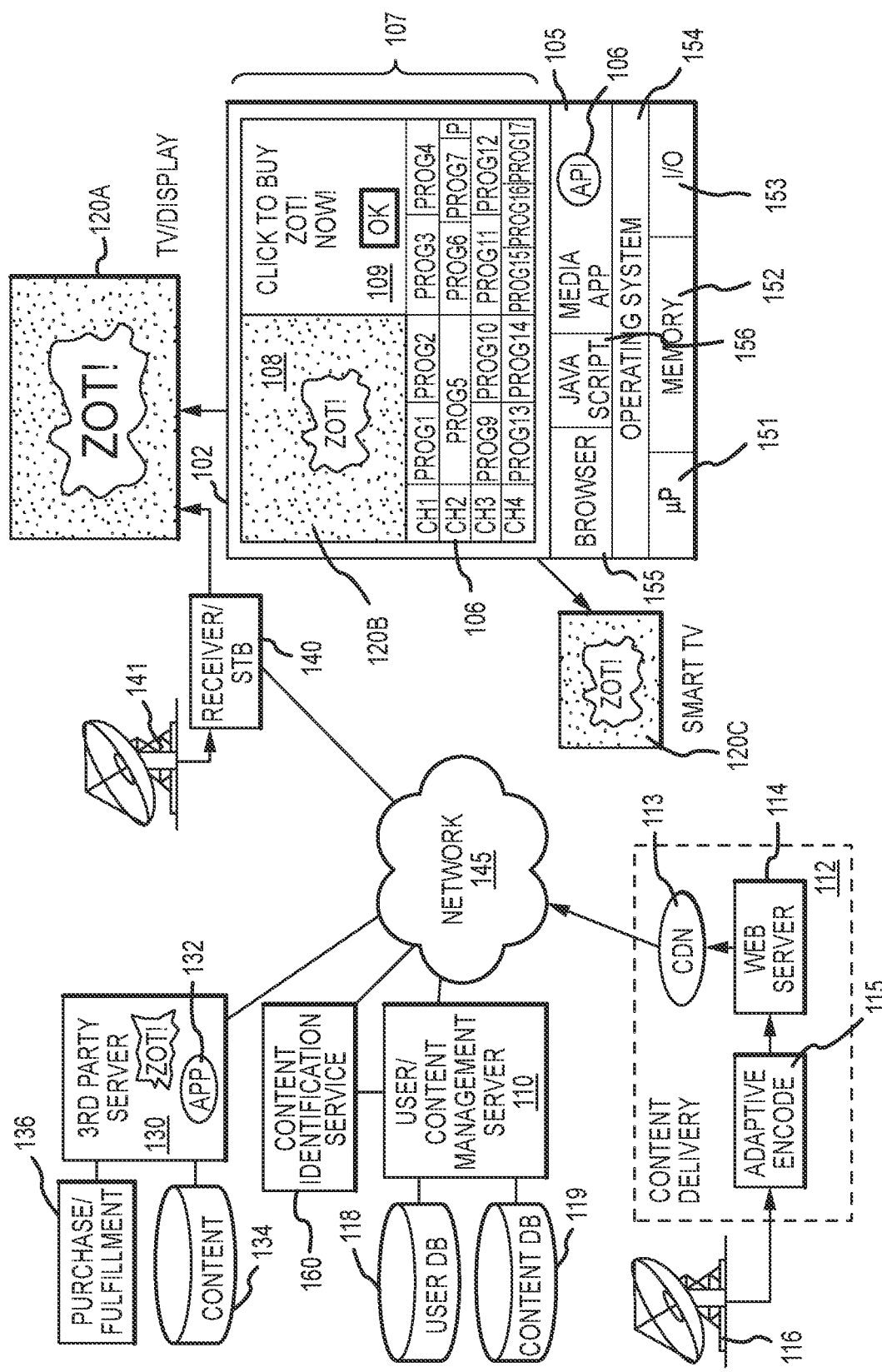

Turning now to the figures, FIG. 1 illustrates on example of a system 100 to provide third party integration into the user's television viewing experience via a computing device 102. Typically, computing device 102 represents a personal computer, mobile phone, laptop or tablet computer, remote control, video game player, media player and/or other "second screen" device that allows viewing of web content or the like at the same time that the viewer is watching a television program. In the example of FIG. 1, a subscriber may be watching a conventional television 120A, a smart television 120B, and/or a television window 120C in the interface of device 102 itself. When an identified program segment (e.g., an advertisement) appears on one or more of the television viewing screens 120A-C, the control application 105 executing on device 102 recognizes the program content based upon information obtained from a content management server 110, based upon information obtained from a content identification service 160, from information contained in an electronic program guide, from information contained in the video stream itself, and/or from any other source. The content identification service 160 receives content from the delivery service (function 207), and then the content identification service 160 uses various techniques (e.g., audio fingerprinting, video recognition) to identify the content. The content identification service 160 then transmits the data identification information to the content management service 110 (function 209), and the content management service 110 transmits the data identification information to the video playback device and display (120A-C) and the remote control app 105 (function 210). In some embodiments, the content management service 110 transmits the data identification information (function 210) included as part of a content stream (function 208) that includes: (1) the programming content, and (2) the data identification information. However, in other embodiments, the content management service 110 transmits the data identification information (function 210) as a separate data transmission that is distinct from the programming content (function 208).

When the content is recognized, application 105 suitably contacts a third party service 130 associated with the then-showing television content to obtain additional content, or to take other actions as appropriate. This contact may be initiated by following a URL or other identifier provided by the content management server 110 or any other source. In the example of FIG. 1, a window 107 of the control application interface displays a web page that includes an instant purchase feature (e.g., a "one-click" link to a retail site) for a product that is being currently advertised on the viewer's television. In this example, the viewer could simply click on the active link to be connected to the third party's web service 130 to purchase the item, or to take other actions. Other actions could include signing up for a mailing list, coupon or free sample. Still other embodiments could use the API 106 to deliver a coupon, voucher or the like directly to device 102 for later redemption; if the product is a digital product (e.g., video, audio, video game, electronic book, or similar content), then the product may be purchased directly using API 105. In this example the newly-purchased product may be downloaded directly to device 102 or to another device associated with the viewer, as desired. Other embodiments could provide video, graphics, text, audio and/or other multimedia content to the interface 107 using HTML5 or similar constructs.

As shown in FIG. 1, computing device 102 is a computer, tablet, mobile phone, media player or other device based upon conventional hardware, such as a processor 151, memory 152 and input/output interfaces 153. Most computing devices 102 operate under control of an operating system 154 that executes applications, such a web browser 155 and media control application 105. In various embodiments, browser 155 and media control application 105 may be combined or otherwise integrated so that web and other media can be simultaneously presented on a display. In the embodiment shown in FIG. 1, a scripting environment 156 (such as JavaScript or the like) is provided to execute client-side scripts embedded in web content obtained from 3rd party service 130 or the like.

Media control application 105 typically provides control functionality to programming viewed on one or more of displays 120A, 120B and/or 120C. That is, the user typically uses media control application 105 to change channels, control PVR/DVR recordings, view electronic program guide data and/or other features as desired. In various embodiments, media control application 105 communicates with services on network 145 to identify currently-viewed television content and/or to present additional third party content that is associated with the currently-viewed television programming. Program content may be identified from data in an electronic program guide provided from content delivery system 112 or content management system 110, for example. Alternatively, program content may be identified based upon audio fingerprinting or other factor by communicating with content management system 110, as described below. After content is identified, additional third party content that is associated with the identified content can be identified by content management system 110 or the like, and a uniform resource locator (URL) or other address of the associated content can be delivered from content management system 110 to computing device 102 as desired. Media player 105 and/or browser 155 can then use the URL/identifier to contact a third party service 130 and obtain additional content related to the currently-viewed program for presentation while the viewer is still watching the identified television programming on display 120A, 120B or 120C.

Third party content is integrated with the media player application 105 using an appropriate application program interface 106, such as an HTML5 interface or the like. API 106 could facilitate any number of third party applications. In addition to supplemental advertising, another service could provide custom video streams (e.g., customized highlight reels based upon the user's preferences; a video highlight clip featuring the viewer's own fantasy sports picks; etc.), customized web pages (e.g., fantasy sports statistics while the viewer is watching games; stock prices while the viewer is watching financial news; local news/weather; etc.), gaming, audio content, messaging, social media and/or the like. A wide array of applications or features could make use of the newly-obtained access to the viewer's second screen while identified programming is being viewed, thereby greatly improving the user experience in many different ways.

FIG. 1 shows an example interface 107 that presents an electronic program guide grid 106, media controls, a program content window 108, and a third party content window 109. The particular implementations of interface 107 may vary widely from embodiment to embodiment to incorporate different and/or additional features. In this example, window 108 provides a display 120B of live or pre-recorded television content; other embodiments could eliminate this display 120B and instead use application 105 to control external displays 120A and/or 120B.

In the example of FIG. 1, remote control application 105 is aware of the content currently being viewed on the television since the viewer uses the application to change channels, to select programs on a DVR/RSDVR, to obtain streaming video and/or the like. In further embodiments, the application 105 is aware of particular ads or other content currently presented on any of the viewer's displays 120A-C. Application 105 may obtain this information from, for example, content management system 110 and/or video delivery system 112. Various systems and techniques for determining and sharing the particular contents of a live stream is described in U.S. patent application Ser. No. 13/836,688, "PRE-DISTRIBUTION IDENTIFICATION OF BROADCAST TELEVISION CONTENT USING AUDIO FINGERPRINTS", which was filed on the same day as this application and which is incorporated herein by reference. Audio fingerprinting, for example, could be used to identify currently-broadcast advertisements and other content so that applications such as those described herein can know which third parties to contact when the contact is shown on one of the user's television displays 120A-C. In this example, the third-party information may be provided to remote control application 105 even if the content viewing is place or time shifted, since the information is associated with the content itself in management system 110 rather than the broadcast schedule. In various embodiments, information is associated with the particular content of advertisements or other programming rather than with the broadcast itself. This allows, for example, third party content to be triggered based upon the content of the ad itself, rather than the program, channel or network that is running the ad. That is, active content could be provided to the API whenever the ad was viewed on any display 120A-C, regardless of the channel that the ad is running on or the time of broadcast. If an advertiser wants to supplement all of its broadcast ads on any network, channel or time with a supplemental web presence, for example, various embodiments of system 100 would be able to provide such features. Further, the content can be identified even if it has been place and/or time shifted, thereby allowing active content to be made available whenever it is of greatest interest to the user. Rather than relying upon guide data or other static data sources to identify advertisement times and contents, then, the use of a live content management system can greatly improve the flexibility and usefulness of the system 100. Moreover, the advertiser receives a benefit in that all of its ads can be enhanced with supplemental content, regardless of the time or network that is broadcasting the ad.

In various embodiments, then, content management system 110 provides information to the application 105 that allows the application 105 to know which advertisements are being played and which third party service 130, if any, to contact for additional content. In various embodiments, the application 105 provides a user interaction window 109 of its interface 107 that can be made available to third parties via the API 106. In a typical implementation, third party content presented in window 109 is requested from the third party service 130 in HTML5 or similar format. Application 105 suitably formats and presents the received content in interface window 107 using Javascript or similar constructs. Javascript or the like could also be used to handle any viewer interactions, inputs or the like that need to be passed from application 105 via API 106 to a server application 132 executing at the third party service 130.

Television programming may be delivered to displays 120A, 120B and/or 120C in any manner. In the example of FIG. 1, television 120A receives a conventional cable, IPTV, broadcast or direct broadcast satellite (DBS) feed 141 from a receiver 140, such as a conventional set top box (STB). Receiver 140 may be in communication with control device 102 to receive instructions for changing channels, setting DVR timers and/or performing other functions as desired.

Displays 120A, 120B and/or 120C may additionally or alternately receive television programming via network 145 from a video-on-demand, RSDVR or other network delivery system 112. In various embodiments, system 112 receives broadcast content 116 that is similar to content 141 received by receiver 140, but that is instead encoded (e.g., adaptively encoded) by encoder 115 and stored with a web server 114 or the like for delivery over network 145. Adaptively encoded media content may be distributed using an appropriate content delivery network (CDN) as desired to provide rapid delivery of program segments requested by media player clients throughout network 145. Program guide data may be provided to computing device 102 from content delivery system 112, content management system 110, another service on network 145, and/or via a television receiver (e.g., receiver 140).

Media content management system 110 suitably includes appropriate computing hardware, software and databases to deliver program information as described herein. In various embodiments, media content management system 110 accesses a user database 118 to authenticate/identify users (e.g., current account holders with a DBS, cable, IPTV or other television delivery service) and to identify content viewed by the various viewers. As noted above, content may be identified based upon program guide data, based upon audio fingerprinting of the actual program being viewed, or in any other manner. To that end, audio fingerprints or other identifying data about various programs, advertisements or other program contents could be stored in database 119. As applications 105 submit audio segments or other data for identification, content management system 110 suitably identifies associated programming and provides the submitting application 105 with URLs or other identifiers of associated third party content.

Third party server 130 suitably includes appropriate computing hardware, software and databases to provide a desired service to applications 105 as described herein. In various embodiments, server 130 suitably executes a server-side application 132 that delivers HTML5 or other web content in response to HTTP or similar requests received from computing devices 102. Applications may vary from service to service, but could include order fulfillment (as processed by system 136), delivery of static or dynamic web content, multimedia content, games and/or other content as desired from database 134.

In practice, then, control application 105 executes on computing device 102. User inputs make changes to programming viewed on displays 120A, 120B and/or 120C as appropriate. Application 105 further communicates with content management service 110 to identify the actual programming that the viewer is watching at any particular time. This programming may represent a program, a scene of a program, a commercial, or the like. After identifying the programming being currently displayed, the application is able to obtain (using network URLs or the like obtained from content management server 110) associated third-party content that can be presented in a window 109 at the same time that the viewer is watching the identified programming. In various embodiments, the associated third-party content could solicit inputs from the viewer that are returned to an application 132 executed by the third party service 130. Communications between the computing device 120 and the third party service 130 are handled by an API 106, as appropriate.

Figure 2:
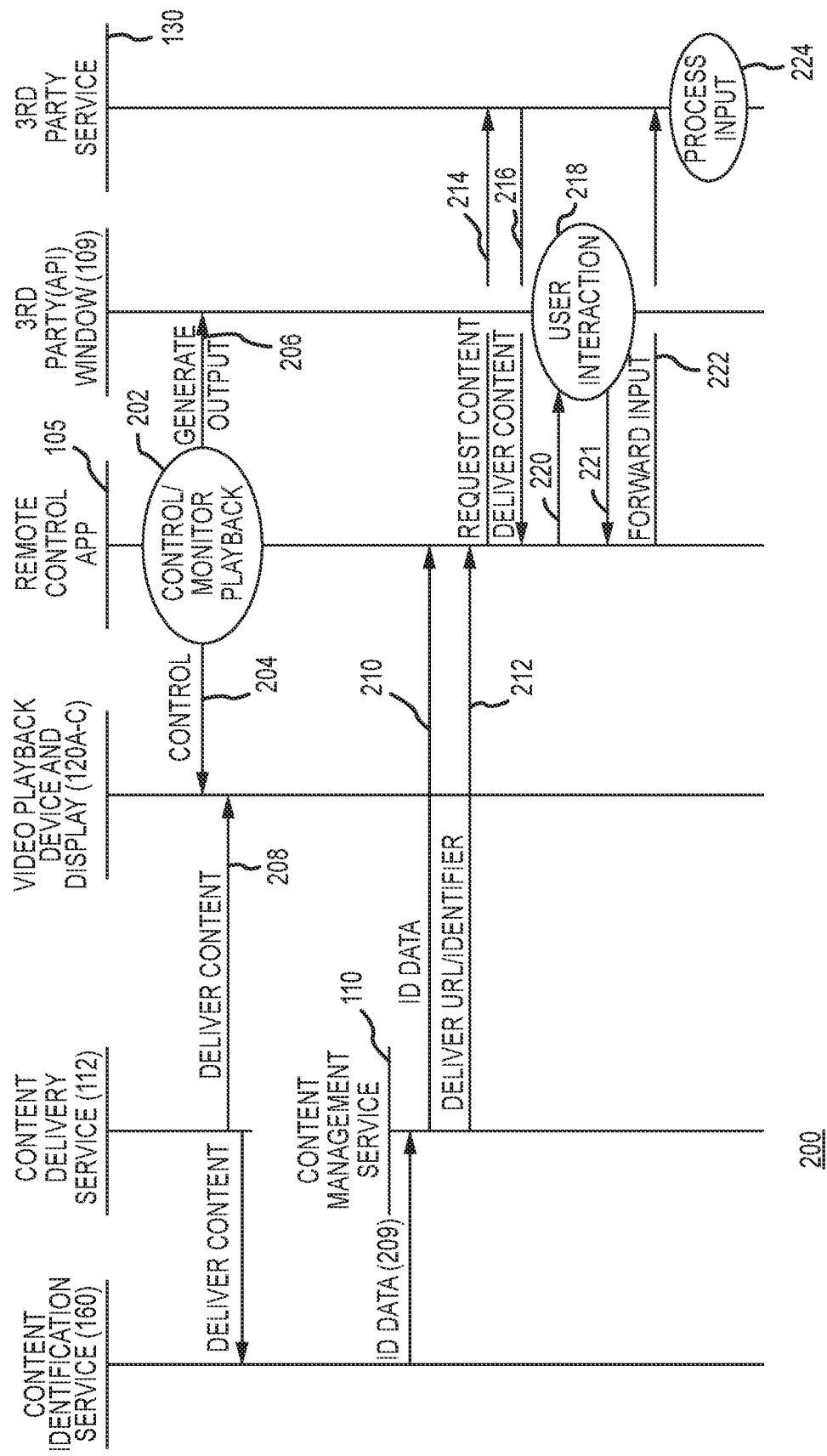
FIG. 2 is a data flow diagram showing an example process for interacting with third parties via a remote control application, in accordance with the disclosed embodiments.

FIG. 2 provides additional detail about various functions that could occur during operation of system 100. As shown in FIG. 2, the viewer uses remote control application 105 to control his or her television viewing experience, so the application 105 "knows" what the viewer is watching, as described above. Using this information, application 105 obtains third party content at appropriate times so that the third party content corresponds to the imagery being presented on the television. The third party content may be any sort of HTML5 content, including audio, video, weblinks and/or the like. Using Javascript or similar constructs, the received content is presented to the viewer in an interface window 107, and customer interactions are processed as needed. Various embodiments could allow the third party content to adjust or otherwise control the playback of content on device 102 and/or on the television, as desired. Further embodiments could provide HTTP live streaming (HLS) or other video content to device 102 and/or televisions 120A-C, as desired. Again, any number of different functions and features could be provided in any number of alternate but equivalent embodiments.

With continued reference to FIG. 2, remote control application 105 executing on computing device 102 suitably controls the television viewing of one or more television displays 102A-C, as described above (function 202). In various embodiments, control application 105 provides control instructions to displays 120A-C (and/or receiver 140, as appropriate) to generate desired imagery on the display 120. Programs may include live broadcasts received from a cable, DBS, terrestrial, IPTV or other broadcast source; other programs could include programs obtained from a personal video recorder that is associated with a receiver 140, a remote storage digital video recorder (RSDVR) accessible via network 145, an on-demand or other video streaming service (e.g., content delivery service 112), or the like. Control instructions 204 sent from application 105 may be sent directly to a television (e.g., smart television 120C), a television receiver 140, to a content delivery service 112, or elsewhere to obtain appropriate television content 208 at the desired video display 120A-C. Again, content may be live broadcast or previously-recorded, as desired.

Remote control application 105 also handles interactions with third party window 109 (function 206) using API 106. In various embodiments, the remote control application 105 uses API 106 to provide third party content that is associated with the currently-viewed television content as the viewer is watching the content. To that end, the remote control application 105 suitably identifies the currently-viewed content (function 210), obtains an identifier for third party content associated with the identified content (function 212), obtains the identified third party content from a third party service 130 (functions 214, 216), and manages interactions between the user and the third party content (function 218) as appropriate.

As noted above, the content identification service 160 identifies the currently-viewed content in any manner, including but not limited to: audio fingerprinting techniques, video identification techniques, and accessing the content management service 110. The application 105 is provided with identification information for the currently-viewed content, by the content identification service 160 (function 210). In the example of FIG. 2, application 105 identifies the content by providing an audio fingerprint or other portion of the actual program content itself to management service 110. In other embodiments, identification data may be provided with electronic program guide data or other information available to application 105 so that application 105 is able to identify the currently-viewed programming itself, without additional query to content management service 110. In such embodiments application 105 may identify the program to the content management service 110 to obtain supplemental content associated with the identified program.

In various embodiments, content management service 110 maintains a database 119 of information that allows identification of programs (e.g., from audio fingerprints or other "biometric" data supplied by application 105). Service 110 additionally maintains a database of URLs or other addresses/identifiers that allow application 105 to locate supplemental content associated with the identified program via network 145. These URLs/identifiers are appropriately delivered to application 105 (function 212) in response to received queries 210.

Having thus received an identifier for content associated with currently-viewed programming, application 105 is able to obtain the identified content from third party server 130 (function 214). Content may be requested using conventional HTTP constructs, for example, or other interaction with application 132 as desired. Third party server 130 suitably obtains the requested content and delivers it to the control application 105 via network 145, as appropriate (function 216).

Third party content is rendered to the viewer in window 109 (or elsewhere, as appropriate). As noted above, application 105 suitably includes API 106 that provides an HTML5 or other interface between the third party service 130 and the application 105. To that end, application 105 suitably renders imagery or other media to the API window 109 (function 220) and processes an inputs received from the API window 109 (function 221) as desired. User interaction (function 218) with the API window 109 may include clicking on a purchase button, requesting additional information, responding to requests for information, controlling a media stream supplied by third party service 130, and/or any other interactions as desired. Inputs received from the user interaction 218 are appropriately forwarded to the third party service 130 (function 222) to thereby allow the remote service 130 to process the input (function 224) as desired.

To continue the example above, an advertisement for a product (e.g., "Zot!") can be recognized as the television ad is presented on a display 120A-C controlled by application 105. This recognition may take place even if the currently-viewed content has been time or place shifted, as desired. The application 105 recognizing the currently-viewed program then obtains a URL or other identifier from content management service 110, and then uses the identifier to request third party content to be presented in a separate window 109 as the identified programming is still being presented on the viewer's display 120A-C. Content is processed using a suitable API 106 that allows third party content to be safely and securely received. Any user inputs (e.g., an input authorizing purchase of an advertised product) are also handled via the API for forwarding to the third party system 130 as appropriate.

The foregoing discussion therefore considers several different systems, devices and methods. These general concepts may be expanded or modified as desired to create any number of alternate but equivalent embodiments. Although advertisements are often discussed above as one example that could be supplemented with third party content, equivalent concepts could be provided to the television programs themselves, or any portion of the programs. A fantasy sports application, for example, could provide user-specific data in window 109 while the viewer is watching a game. Other applications could provide supplemental information about the currently-viewed movie or show, or actors or actresses appearing in the show, or any other data about the program itself. Still other applications could provide interactive games, streaming video (e.g., HLS video), or other content in HTML5 or other format.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

Figure 3:
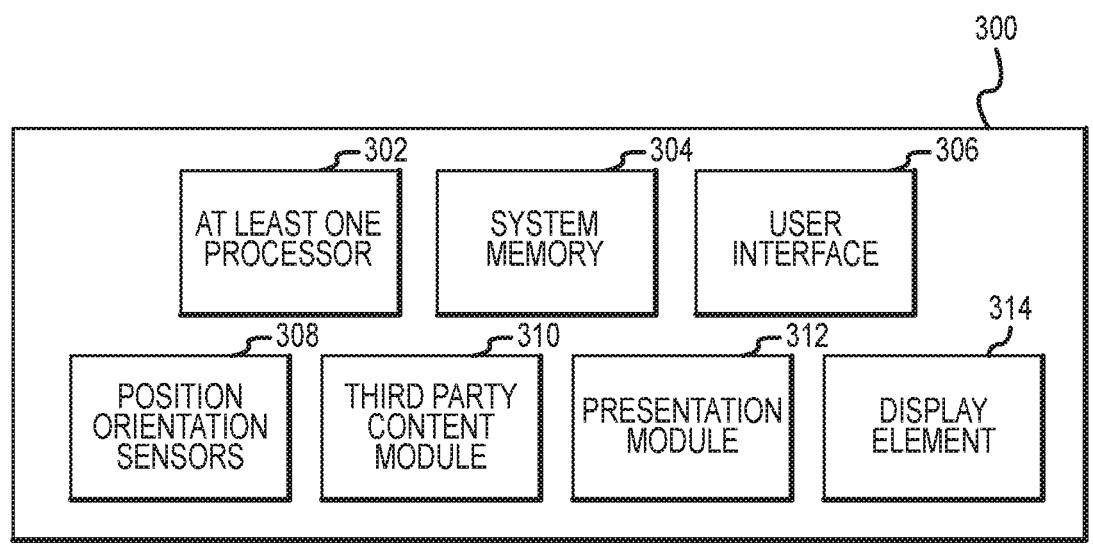
FIG. 3 is a functional block diagram of an electronic device, in accordance with the disclosed embodiments.

FIG. 3 is a functional block diagram of an electronic device 300, in accordance with the disclosed embodiments. It should be noted that the electronic device 300 can be implemented with the device 102 depicted in FIG. 1. In this regard, the electronic device 300 shows certain elements and components of the device 102 in more detail. Exemplary embodiments of the electronic device 300 may be implemented using a handheld computing device (e.g., a smartphone, a tablet computer) which may be positioned according to a particular orientation (e.g., landscape orientation, portrait orientation).

The electronic device 300 generally includes, without limitation, at least one processor 302, a system memory element 304, a user interface 306, position orientation sensors 308, a third party content module 310, a presentation module 312, and a display element 314. These elements and features of the electronic device 300 may be operatively associated with one another, coupled to one another, or otherwise configured to cooperate with one another as needed to support the desired functionality—in particular, presenting third party content associated with particular audio/video content in "empty space" or blank space created by positioning the electronic device according to a particular orientation, as described herein. For ease of illustration and clarity, the various physical, electrical, and logical couplings and interconnections for these elements and features are not depicted in FIG. 3. Moreover, it should be appreciated that embodiments of the electronic device 300 will include other elements, modules, and features that cooperate to support the desired functionality. For simplicity, FIG. 3 only depicts certain elements that relate to the third party content presentation techniques described in more detail below.

The at least one processor 302 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 302 may be implemented as a combination of computing devices, e.g., a combination of digital signal processors and microprocessors, a plurality of microprocessors, one or more microprocessors in conjunction with a digital signal processor core, or any other such configuration.

The at least one processor 302 communicates with system memory 304. The system memory 304 may be used to store audio/video content metadata, electronic program guide data, automatic content recognition data, promotion frequencies, or any other data applicable to operations of the electronic device 300. The system memory 304 may be realized using any number of devices, components, or modules, as appropriate to the embodiment. In practice, the system memory 304 could be realized as RAM memory, flash memory, EPROM memory, EEPROM memory, registers, a hard disk, a removable disk, or any other form of storage medium known in the art. In certain embodiments, the system memory 304 includes a hard disk, which may also be used to support functions of the at least one processor 302. The system memory 304 can be coupled to the at least one processor 302 such that the at least one processor 302 can read information from, and write information to, the system memory 304. In the alternative, the system memory 304 may be integral to the at least one processor 302. As an example, the at least one processor 302 and the system memory 304 may reside in a suitably designed application-specific integrated circuit (ASIC).

The user interface 306 may include or cooperate with various features to allow a user to interact with the electronic device 300. Accordingly, the user interface 306 may include various human-to-machine interfaces, e.g., a keypad, keys, a keyboard, buttons, switches, knobs, a touchpad, a joystick, a pointing device, a virtual writing tablet, a touch screen, a microphone, a remote control, or any device, component, or function that enables the user to select options, input information, or otherwise control the operation of the electronic device 300. For example, the user interface 306 could be manipulated by an operator to select a set of audio/video content for viewing, select and view electronic program guide data, make selections to view or purchase items from presented third party content, or the like.

In certain embodiments, the user interface 306 may include or cooperate with various features to allow a user to interact with the electronic device 300 via graphical elements rendered on a display element 314. Accordingly, the user interface 306 may initiate the creation, maintenance, and presentation of a graphical user interface (GUI). In certain embodiments, the display element 314 implements touch-sensitive technology for purposes of interacting with the GUI. Thus, a user can manipulate the GUI by moving a cursor symbol rendered on the display element 314, or by physically interacting with the display element 314 itself for recognition and interpretation, via the user interface 306. In some embodiments, the user interface 306 may cooperate with a particular software application (e.g., an "app") implemented on a smart device or computer to provide display data to a graphical user interface (GUI) in the app. In embodiments using an app, the user interface 306 and the display element 314 are configured to cooperatively display audio/video content and third party content via the GUI, in addition to graphical elements suitable for changing channels, controlling personal video recorder (PVR), digital video recorder (DVR), and/or remote storage DVR (RS-DVR) recordings, viewing electronic program guide data, making selections to purchase or view websites associated with items presented by third party content, and/or other control functionality associated with video content control and playback.

The position orientation sensors 308 are suitably configured to determine an orientation of the electronic device 300, and to provide such orientation information to a presentation module 312 such that the electronic device 300 displays audio/video content (e.g., television programming, movies, sports presentations, musical presentations, award shows) and associated third party content according to a current orientation.

The third party content module 310 is configured to determine appropriate third party content associated with the currently presented audio/video content. As described previously, the electronic device 300 is aware of the audio/video content currently being presented and viewed, since the user uses a remote control application (see reference 105 of FIG. 1) to change channels, select programs on a DVR/RSDVR, to obtain streaming video, or the like. In other embodiments, the electronic device 300 may first identify currently presented audio/video content in order to determine the appropriate third party content that is associated with the currently presented audio/video content. The third party content module 310 generally accesses one or more databases (see references 119, 134 of FIG. 1) to identify the currently presented audio/video content and/or the appropriate audio/video content associated with the currently presented audio/video content.

The presentation module 312 is configured to display audio/video content and third party content according to an orientation of the electronic device 300. In certain embodiments, the presentation module 312 obtains orientation information directly from the position orientation sensors 308, and in other embodiments, the presentation module 312 obtains the orientation information from system memory 304 or another element of the electronic device 300 configured to obtain the orientation information from the position orientation sensors 308 and to store the orientation information in such a way that the orientation information is accessible to the presentation module 312.

In practice, the third party content module 310 and/or the presentation module 312 may be implemented with (or cooperate with) the at least one processor 302 to perform at least some of the functions and operations described in more detail herein. In this regard, the third party content module 310 and/or the presentation module 312 may be realized as suitably written processing logic, application program code, or the like.

The display element 314 operates cooperatively with the presentation module 312 to display, render, or otherwise convey various icons, text, and/or graphical elements associated with audio/video content, third party content, electronic program guide data, or the like. In some embodiments, the display element 314 may be implemented as an element of the electronic device 300 that is separate and distinct from the user interface 306. However, in an exemplary embodiment, the display element 314 is cooperatively implemented with the user interface 306 as a touchscreen on the electronic device 300.

FIG. 4 is a diagram of an electronic device 402 positioned according to a landscape orientation 404, and the electronic device 402 positioned according to a portrait orientation 406, in accordance with the disclosed embodiments. In the first embodiment shown, the electronic device 402 is positioned according to a landscape orientation 404 when the electronic device 402 is turned in such a way that the lateral sides 406 are positioned at the top and bottom of the electronic device 402, and wherein the presentation of audio/video content 408 is presented in such a way as to fill the display of the electronic device 402. In the second embodiment shown, the electronic device 402 is positioned according to a portrait orientation 410 when the electronic device 402 is turned in such a way that the lateral sides 406 are positioned on the left and right sides of the electronic device 402, and wherein the presentation of audio/video content 408 is presented in such a way as to leave empty or blank space in the display of the electronic device 402.

The first and second embodiments shown are generally used during presentation of audio/video content having a "widescreen" format. Thus, when the electronic device 402 is positioned or turned according to a landscape orientation 404, the presentation of audio/video content 408 appears larger and fills the screen or display, and when the electronic device 402 is positioned or turned according to a portrait orientation 410, the presentation of audio/video content 408 appears smaller and does not fill the screen or display. Here, during presentation of a set of audio/video content, when the electronic device 402 detects that the position of the electronic device 402 is the portrait orientation 410 and therefore, there is empty space on the display, the electronic device 402 may use the empty space to present third party content.

Figure 5:
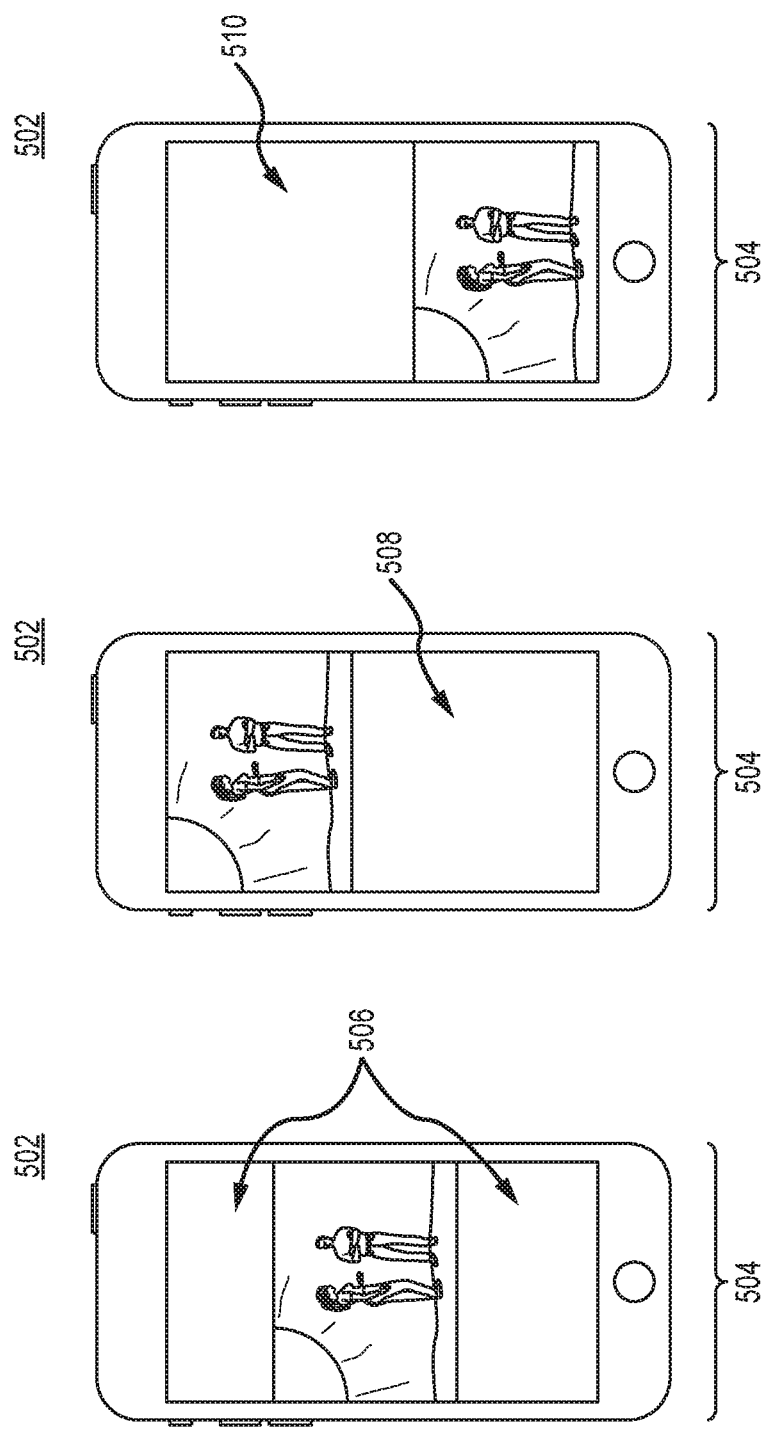
FIG. 5 is a diagram of an electronic device positioned in a portrait orientation and presenting available display space, in accordance with the disclosed embodiments.

FIG. 5 is a diagram of an electronic device 502 positioned in a portrait orientation 504 and presenting available display space, in accordance with the disclosed embodiments. The electronic device 502 presents a "widescreen" set of audio/video content that is configured to fill the display of the electronic device 502 when presented according to a landscape orientation. However, as shown, the electronic device 502 is positioned according to a portrait orientation 504, and thus, the set of audio/video content is presented such that the audio/video content presentation does not fill the display.

The electronic device 502 may present the audio/video content in any position of the display, leaving the remaining "empty" or blank space adjacent to the presentation of the audio/video content. In the first embodiment shown, the electronic device 502 presents the set of audio/video content in a center position of the display, effectively dividing the empty space 506 into two portions above and below the presentation of audio/video content. In the second embodiment shown, the electronic device 502 presents the set of audio/video content in a topmost position of the display of the electronic device 502, and presents an undivided set of empty space 508 below the presentation of the audio/video content. In the third embodiment shown, the electronic device 502 presents the set of audio/video content in a bottom-most position of the display of the electronic device 502, and presents an undivided set of empty space 510 above the presentation of the audio/video content.

In each of these embodiments, third party content may be displayed in the empty space 506, 508, 510 adjacent to the presentation of audio/video content, in any way. For example, in the first embodiment, the third party content may be presented in the empty space 506 (1) above, (2) below, or (3) above-and-below the presentation of audio/video content. In each of the embodiments shown, the third party content may fill the available empty space 506, 508, 510 or may be presented using a subset of the empty space 506, 508, 510.

FIG. 6 is a diagram of an electronic device 602 positioned according to a portrait orientation 604, and the electronic device 602 positioned according to a landscape orientation 610, in accordance with the disclosed embodiments. In the first embodiment shown, the electronic device 602 is positioned according to a portrait orientation 604 wherein the electronic device 602 is turned in such a way that the lateral sides 406 are positioned on the right side and left side of the electronic device 602, and wherein the presentation of audio/video content 608 is presented in such a way as to fill the display of the electronic device 602. In the second embodiment shown, the electronic device 602 is positioned according to a landscape orientation 610 wherein the electronic device 602 is turned in such a way that the lateral sides 606 are positioned at the top and bottom of the electronic device 602, and wherein the presentation of audio/video content 608 is presented in such a way as to leave empty or blank space on the display of the electronic device 602.

The first and second embodiments shown are generally used during presentation of audio/video content having a "vertical" format. In other words, the audio/video content being presented was originally recorded using a recording device positioned in a portrait orientation 604 during recording. Thus, during playback of the audio/video content, when the electronic device 602 is positioned or turned according to a portrait orientation 604, the presentation of audio/video content 608 appears larger and fills the screen or display. However, when the electronic device 602 is positioned or turned according to a landscape orientation 610, the presentation of audio/video content 608 appears smaller and does not fill the screen or display. Here, during presentation of a set of audio/video content, when the electronic device 602 detects that the position of the electronic device 602 is the landscape orientation 610 and therefore, there is empty space on the display, the electronic device 602 may use the empty space to present third party content.

Figure 7:
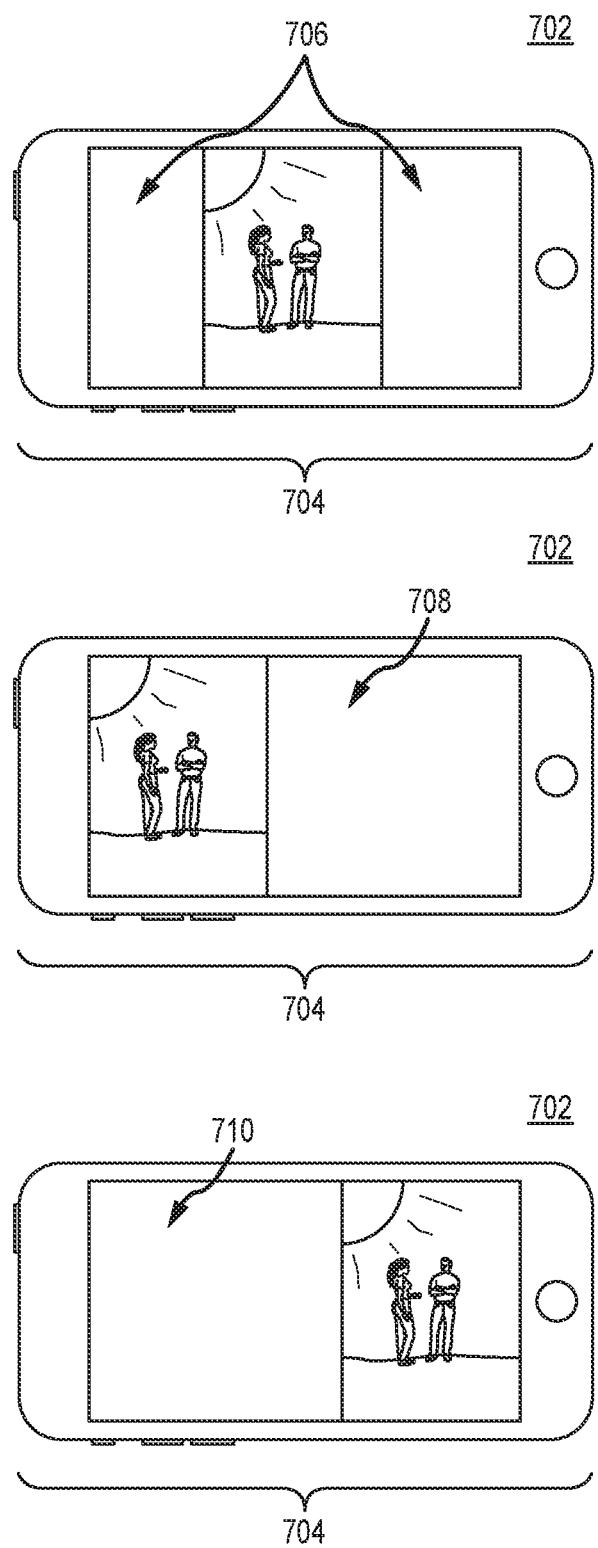
FIG. 7 is a diagram of an electronic device positioned in a landscape orientation and presenting available display space, in accordance with the disclosed embodiments.

FIG. 7 is a diagram of an electronic device 702 positioned in a landscape orientation 704 and presenting available display space, in accordance with the disclosed embodiments. The electronic device 702 presents a "vertical" set of audio/video content that is configured to fill the display of the electronic device 702 when presented according to a portrait orientation. However, as shown, the electronic device 702 is positioned according to a landscape orientation 704, and thus, the set of audio/video content is presented such that the audio/video content presentation does not fill the display.

The electronic device 702 may present the audio/video content in any position of the display, leaving the remaining "empty" space adjacent to the presentation of the audio/video content. In the first embodiment shown, the electronic device 702 presents the set of audio/video content in a center position of the display, effectively dividing the empty space 706 into two portions to the right and to the left of the presentation of audio/video content. In the second embodiment shown, the electronic device 702 presents the set of audio/video content in a left-most position of the display of the electronic device 702, and presents an undivided set of empty space 708 to the adjacent-right of the presentation of the audio/video content. In the third embodiment shown, the electronic device 702 presents the set of audio/video content in a right-most position of the display of the electronic device 702, and presents an undivided set of empty space 710 to the adjacent-left of the presentation of the audio/video content.

In each of these embodiments, third party content may be displayed in the empty space 706, 708, 710 adjacent to the presentation of audio/video content, in any way. For example, in the first embodiment, the third party content may be presented in the empty space 706 (1) to the right of the presentation of audio/video content, (2) to the left of the presentation of audio/video content, or (3) to the right and to the left of the presentation of audio/video content. In each of the embodiments shown, the third party content may fill the available empty space 706, 708, 710 or may be presented using a subset of the empty space 706, 708, 710.

Figure 8:
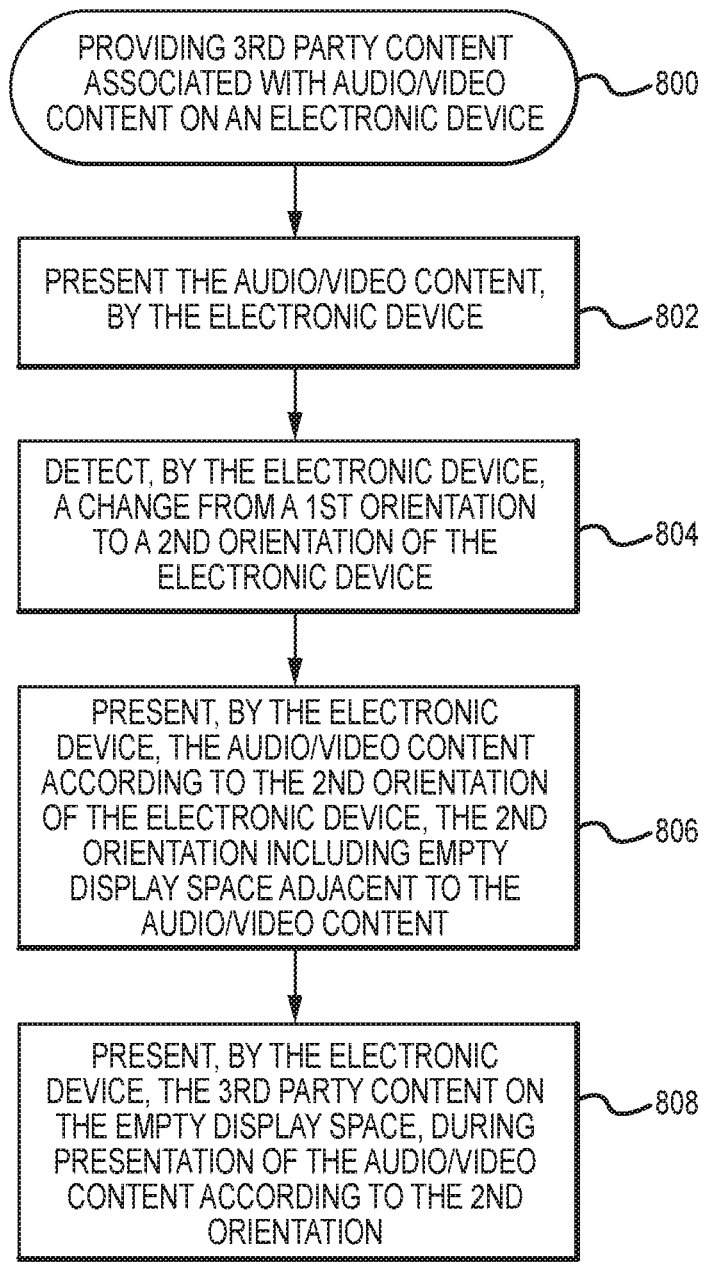
FIG. 8 is a flow chart that illustrates an embodiment of a process for providing third party content associated with television programming on a computing device.

FIG. 8 is a flow chart that illustrates an embodiment of a process 800 for providing third party content associated with audio/video content on an electronic device. First, the process 800 presents the audio/video content, by the electronic device (step 802). The audio/video content may include television programming, streaming or on-demand programming, movies, sports events, award shows, concerts or other musical presentations, or any other type of audio/video presentation accessible via the electronic device. Next, the process 800 detects, by the electronic device, a change from a first orientation to a second orientation of the electronic device (step 804). Here, the process 800 obtains data indicating that the electronic device has changed orientation. This obtained data may indicate a change from a landscape orientation to a portrait orientation, or a change from a portrait orientation to a landscape orientation (as described in FIGS. 4-7). In certain embodiments, the process 800 obtains data indicating the change in orientation from position orientation sensors or a stored memory location of the electronic device (see references 304, 308 of FIG. 3). In some embodiments, the process 800 obtains data indicating the change in orientation from a user input selection that triggers the remaining steps of the process 800, described below.

The process 800 then presents, by the electronic device, the audio/video content according to the second orientation of the electronic device, the second orientation including empty display space adjacent to the television programming (step 806). When the electronic device is "flipped" (i.e., changes orientation) from a landscape orientation to a portrait orientation, and the audio/video content is "widescreen" content, then the audio/video content presentation becomes smaller than the display screen of the electronic device and empty space is then revealed on the top and/or bottom of the display screen of the electronic device. This embodiment is described previously with regard to FIGS. 4-5. However, when the electronic device is flipped (i.e., changes orientation) from a portrait orientation to a landscape orientation, and the audio/video content is "vertical" content, then the audio/video content presentation becomes smaller than the display screen of the electronic device and empty space is then revealed on right side and/or left side the display screen of the electronic device. This embodiment is described previously with regard to FIGS. 6-7.

Next, the process 800 presents, by the electronic device, the third party content on the empty display space, during presentation of the audio/video content according to the second orientation (step 808). The third party content may include supplemental advertising, custom video streams, customized web pages, gaming, audio content, messaging, social media, or the like. Here, the process 800 presents any appropriate third party content that is associated with the audio/video content being presented, as described previously with regard to FIGS. 1-2.

Figure 9:
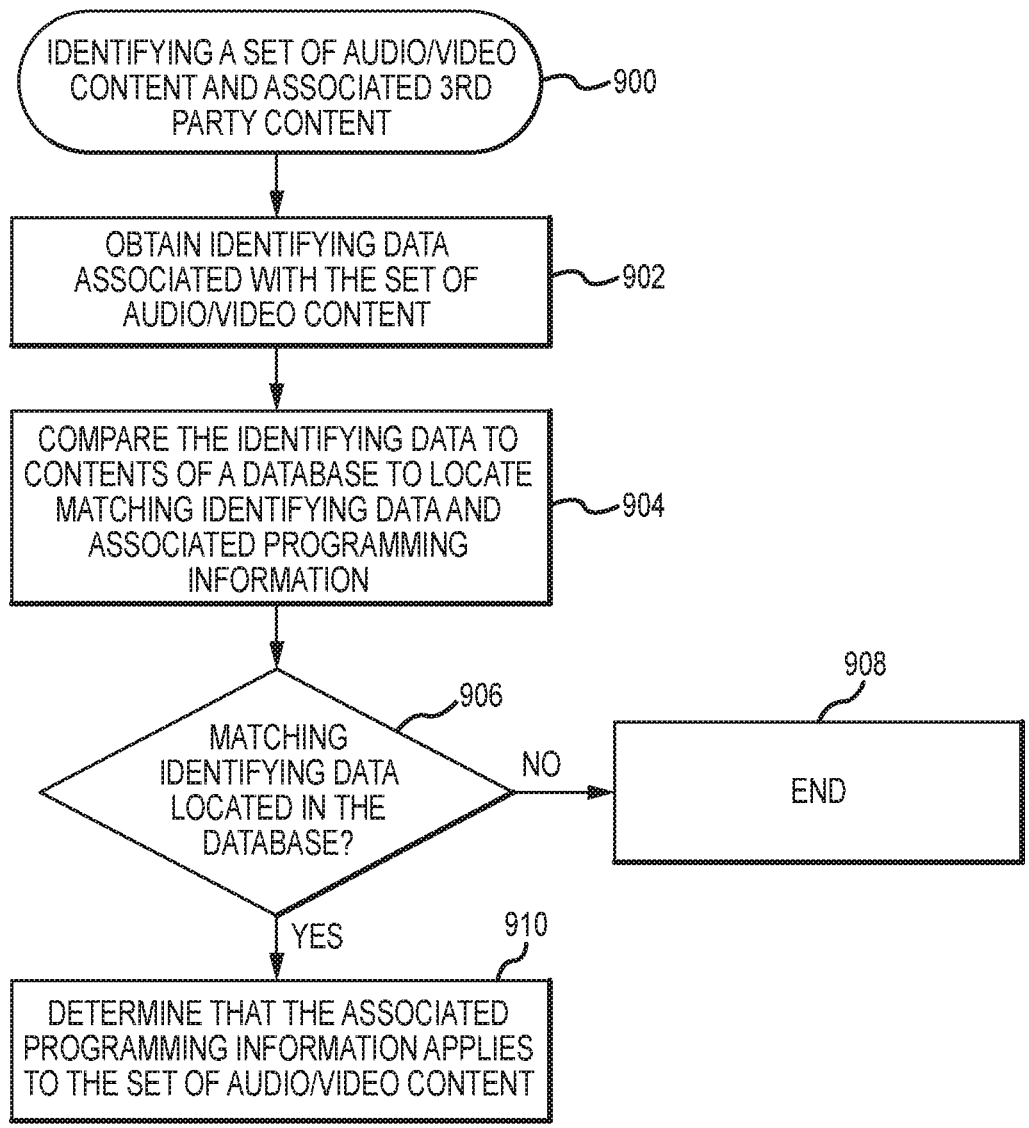
FIG. 9 is a flow chart that illustrates an embodiment of a process for identifying a set of television programming and associated third party content.

FIG. 9 is a flow chart that illustrates an embodiment of a process 900 for identifying a set of audio/video content and associated third party content. First, the process 900 obtains identifying data associated with the set of audio/video content. As described previously with regard to FIG. 1, the identifying data may include electronic program guide data, audio fingerprinting data, or other data suitable to identify a particular set of audio/video content.

Next, the process 900 compares the identifying data to contents of a database to located matching identifying data and associated programming information (step 904). At this point, the process 900 has obtained identifying data associated with a set of audio/video content currently being presented to a user, and then the process 900 compares the obtained identifying information to other, stored identifying information associated with a plurality of sets of audio/video content to locate a match.

When a match between the identifying data and the contents of the database is not located (the "No" branch of 906), then the process 900 ends. In this case, the process 900 has not identified the set of audio/video content and thus, is unable to identify a set of appropriate third party content for presentation. However, when a match between sets of identifying data has been located (the "Yes" branch of 906), then the process 900 determines that the associated programming information (i.e., the name of the set of audio/video content associated with the matching electronic program guide data or the matching audio fingerprint) applies to the set of audio/video content. Here, the process 900 has identified the set of audio/video content, and appropriate third party content may be presented.

The various tasks performed in connection with processes 800-900 may be performed by software, hardware, firmware, or any combination thereof. For illustrative purposes, the preceding description of processes 800-900 may refer to elements mentioned above in connection with FIGS. 1-7. In practice, portions of processes 800-900 may be performed by different elements of the described system. It should be appreciated that processes 800-900 may include any number of additional or alternative tasks, the tasks shown in FIGS. 8-9 need not be performed in the illustrated order, and processes 800-900 may be incorporated into a more comprehensive procedure or process having additional functionality not described in detail herein. Moreover, one or more of the tasks shown in FIGS. 8 and/or 9 could be omitted from an embodiment of the processes 800-900 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method executable by an electronic device to provide user control of a remote control application configured to provide a set of video content to the electronic device, the method for presenting internet content associated with the set of video content, the method comprising:
    executing the remote control application that:
        during playback of the set of video content on the electronic device,
            detects that the electronic device has been repositioned to reveal blank space on a display of the electronic device, wherein the display presents the blank space and the set of video content after repositioning of the electronic device;
            recognizes the set of video content presented using electronic program guide data associated with the set of video content, wherein the set of video content is provided by a content delivery service;
            obtains an identifier for related internet content associated with the recognized set of video content, wherein the identifier is obtained from the content delivery service;
            transmits a request to a third party service to obtain the related internet content associated with the recognized set of video content, wherein the request includes the identifier for the related internet content;
        provide an interface to the third party service via an application programming interface (API) of the remote control application;
        in response to the request, receive the related internet content from the third party service via the API of the remote control application;
        automatically presents the related internet content from the third party on the blank space, by the electronic device, in response to detecting that the electronic device has been repositioned during playback of the set of video content;
    wherein the remote control application provides control functionality including channel-changing, controlling recordings for digital video recorder (DVR), and remote storage DVR (RSDVR).

2. The method of claim 1, wherein the related internet content comprises an advertisement for a product or service.

3. The method of claim 1, wherein the related internet content comprises a webpage associated with the set of video content.

4. The method of claim 1, wherein identifying the set of video content further comprises:
    establishing, by the electronic device, a communication connection to a remote server configured to store a database of video content and associated identifying data;
    accessing, by the electronic device, the database of video content and associated identifying data;
    comparing the set of video content to the database, to locate a match; and
    when a match has been located, determining that the set of video content comprises the match.

5. The method of claim 4, further comprising obtaining, by the electronic device, a first set of identifying data from the set of video content;
    wherein comparing the set of video content to the database further comprises comparing the first set of identifying data to the associated identifying data, to locate the match.

6. The method of claim 1, further comprising:
    detecting that the electronic device has been repositioned from a landscape orientation to portrait orientation, wherein the portrait orientation reveals the blank space on the display.

7. The method of claim 1, wherein detecting that the electronic device has been repositioned further comprises:
    receiving, by the electronic device, a user input selection indicating that the electronic device has been repositioned; and
    presenting the related content, in response to the user input selection.

8. A personal computing device comprising:
    an interface to a network;
    a system memory element;
    at least one sensor configured to detect a change to an orientation of the personal computing device;
    a display element, configured to present video content and web content provided by a remote control application, wherein the video content is provided by a content delivery service via the interface to the network; and
    at least one processor communicatively coupled to the interface, the system memory element, the at least one sensor, and the display element, the at least one processor configured to:
    execute the remote control application that:
        during playback of the video content by the personal computing device, and in response to a detected change to the orientation of the personal computing device,
            identifies an unused portion of the display element of the personal computing device, the unused portion located adjacent to the video content on the display element;
            recognizes the video content presented using electronic program guide data associated with the video content, wherein the video content is provided by a content delivery service;
            obtains an identifier for related internet content associated with the recognized video content, wherein the identifier is obtained from the content delivery service;

transmits a request to a third party service to obtain the related internet content associated with the recognized video content, wherein the request includes the identifier for the related internet content;

provide an interface to the third party service via an application programming interface (API) of the remote control application;

in response to the request, receives the related internet content from the third party service via the API of the remote control application;

automatically presents the related internet content on the unused portion of the display element, in response to the detected change to the orientation of the personal computing device, while simultaneously presenting the video content on the display element;

wherein the remote control application provides control functionality including channel-changing, controlling recordings for digital video recorder (DVR), and remote storage DVR (RSDVR).

9. The computing device of claim 8, wherein the processor is further configured to:

determine that the change to the orientation of the computing device comprises a change from a landscape orientation to a portrait orientation;

initiate presentation of the video content at a centered position of the display element, according to the portrait orientation; and detect the unused portion of the display element above and below the centered position, wherein the related internet content is presented above and below the centered position.

10. The computing device of claim 8, wherein the processor is further configured to:

determine that the change to the orientation of the computing device comprises a change from a landscape orientation to a portrait orientation;

initiate presentation of the video content at a top position of the display element, according to the portrait orientation; and detect the unused portion of the display element below the top position, wherein the related internet content is presented below the top position.

11. The computing device of claim 8, wherein the processor is further configured to:

determine that the change to the orientation of the computing device comprises a change from a landscape orientation to a portrait orientation;

initiate presentation of the video content at a bottom position of the display element, according to the portrait orientation; and detect the unused portion of the display element above the bottom position, wherein the related internet content is presented above the bottom position.

12. The computing device of claim 8, wherein the processor is further configured to:

determine that the change to the orientation of the computing device comprises a change from a portrait orientation to a landscape orientation;

automatically initiate presentation of the video content at a center position of the display element, in response to the detected change to the orientation and according to the landscape orientation; and detect the unused portion of the display element adjacent-right and adjacent-left of the center position, wherein the related internet content is presented adjacent-right and adjacent-left of the center position, and wherein the video content is automatically presented simultaneously with the related internet content.

13. The computing device of claim 8, wherein the processor is further configured to:

determine that the change to the orientation of the computing device comprises a change from a portrait orientation to a landscape orientation;

automatically initiate presentation of the video content at a leftmost position of the display element, in response to the detected change to the orientation and according to the landscape orientation; and detect the unused portion of the display element adjacent-right of the leftmost position, wherein the related internet content is presented adjacent-right of the leftmost position, and wherein the video content is automatically presented simultaneously with the related internet content.

14. The computing device of claim 8, wherein the processor is further configured to:

determine that the change to the orientation of the computing device comprises a change from a portrait orientation to a landscape orientation;

automatically initiate presentation of the video content at a rightmost position of the display element, in response to the detected change to the orientation and according to the landscape orientation; and detect the unused portion of the display element adjacent-left of the rightmost position, wherein the related internet content is presented adjacent-left of the rightmost position, and wherein the video content is automatically presented simultaneously with the related internet content.

15. A method to provide third party content associated with television programming on a computing device having a processor and a memory, the method executable by the computing device to provide user control of a remote control application configured to provide the television programming to the computing device, the method comprising:

executing the remote control application that:
presents the television programming, by the computing device;
detects a change from a first orientation to a second orientation of the computing device;
presents the television programming according to the second orientation of the computing device, the second orientation including empty display space adjacent to the television programming;
recognizes the television programming presented using electronic program guide data associated with the television programming, wherein the television programming is provided by a content delivery service;
obtains an identifier for related internet content associated with the recognized television programming, wherein the identifier is obtained from the content delivery service;
transmits a request to a third party service to obtain the related internet content associated with the recognized television programming, wherein the request includes the identifier for the related internet content, and wherein the third party content comprises the related internet content;
provides an interface to the third party service via an application programming interface (API) of the remote control application;

in response to the request, receives the related internet content from the third party service via the API of the remote control application;

automatically presents the third party content on the empty display space, in response to detecting the change from the first orientation to the second orientation, during presentation of the television programming according to the second orientation;

wherein the remote control application provides control functionality including channel-changing, controlling recordings for digital video recorder (DVR), and remote storage DVR (RSDVR).

16. The method of claim 15, wherein the first orientation comprises a landscape orientation; and wherein the second orientation comprises a portrait orientation.

17. The method of claim 15, wherein the first orientation comprises a portrait orientation; and wherein the second orientation comprises a landscape orientation.

18. The method of claim 15, wherein identifying the television programming further comprises:

obtaining identifying data associated with the television programming;

comparing the identifying data to contents of a database to locate matching identifying data and associated programming information; and when the matching identifying data is located, determining that the associated programming information applies to the television programming.

* * * * *